(12) United States Patent
Gregg et al.

(10) Patent No.: US 9,032,020 B2
(45) Date of Patent: May 12, 2015

(54) ONLINE VIDEO ENHANCEMENT

(75) Inventors: John Gregg, Seattle, WA (US); Jason Toff, San Francisco, CA (US); Josh Sassoon, San Francisco, CA (US); Thomas Benton Bridgwater, San Francisco, CA (US)

(73) Assignee: Google Inc., Mountain View, CA (US)

( * ) Notice: Subject to any disclaimer, the term of this patent is extended or adjusted under 35 U.S.C. 154(b) by 306 days.

(21) Appl. No.: 13/351,922

(22) Filed: Jan. 17, 2012

(65) Prior Publication Data

US 2013/0173690 A1 Jul. 4, 2013

Related U.S. Application Data

(60) Provisional application No. 61/581,251, filed on Dec. 29, 2011.

(51) Int. Cl.
| G06F 15/16 | (2006.01) |
| H04N 21/222 | (2011.01) |
| H04N 21/27 | (2011.01) |
| H04N 21/2743 | (2011.01) |
| H04N 21/854 | (2011.01) |
| H04N 21/858 | (2011.01) |

(52) U.S. Cl.
CPC ............ H04N 21/222 (2013.01); H04N 21/27 (2013.01); H04N 21/2743 (2013.01); H04N 21/854 (2013.01); H04N 21/8586 (2013.01)

(58) Field of Classification Search
CPC .................................. H04N 7/173; H04N 7/10
See application file for complete search history.

(56) References Cited

U.S. PATENT DOCUMENTS

| 5,237,648 | A | 8/1993 | Mills et al. |
| 6,081,611 | A | 6/2000 | Linford et al. |
| 6,414,686 | B1 | 7/2002 | Protheroe et al. |
| 6,621,503 | B1 | 9/2003 | Ubillos |
| 6,670,966 | B1 | 12/2003 | Kusanagi |
| 7,287,226 | B2 | 10/2007 | Maymudes et al. |
| 7,559,017 | B2 | 7/2009 | Datar et al. |
| 7,716,376 | B1 | 5/2010 | Price et al. |
| 7,739,599 | B2 | 6/2010 | Patten et al. |
| 7,769,270 | B2 | 8/2010 | Nakamura et al. |
| 7,769,819 | B2 | 8/2010 | Lerman et al. |
| 7,788,585 | B2 | 8/2010 | Ubillos |
| 7,974,485 | B1 | 7/2011 | Azar et al. |
| 7,992,183 | B1 | 8/2011 | Harrenstein |
| 8,032,649 | B2 | 10/2011 | Gupta et al. |
| 8,898,316 | B2 * | 11/2014 | Facemire et al. ............. 709/228 |
| 2002/0048413 | A1 | 4/2002 | Kusunoki |

(Continued)

OTHER PUBLICATIONS

"Image and Video Abstraction by Coherence-Enhancing Filtering"—Kang et al, Eurographics, Feb. 2011 http://www.cs.jhu.edu/~misha/ReadingSeminar/Papers/Kyprianidis11.pdf.*

(Continued)

*Primary Examiner* — Randy Scott
(74) *Attorney, Agent, or Firm* — Lowenstein Sandler LLP

(57) ABSTRACT

A method for online enhancement of videos includes rendering, at one or more computers, a first video stream based on a first video; transmitting the first video stream to a client; receiving, at the one or more computers, a first user input from a client, the first user input selecting at least one enhancement operation; rendering, at the one or more computers, a second video stream based on the first video and the at least one enhancement operation; and transmitting the second video stream to the client.

23 Claims, 9 Drawing Sheets

(56) References Cited

U.S. PATENT DOCUMENTS

| | | | |
|---|---|---|---|
| 2002/0097258 A1 | 7/2002 | Maymudes et al. | |
| 2005/0025454 A1 | 2/2005 | Nakamura et al. | |
| 2005/0039197 A1 | 2/2005 | Ahmad et al. | |
| 2006/0277470 A1 | 12/2006 | Schneider et al. | |
| 2007/0183741 A1 | 8/2007 | Lerman et al. | |
| 2007/0189708 A1 | 8/2007 | Lerman et al. | |
| 2008/0072261 A1 | 3/2008 | Ralston et al. | |
| 2008/0072271 A1* | 3/2008 | Wilson et al. | 725/110 |
| 2009/0142030 A1 | 6/2009 | Lee et al. | |
| 2010/0119177 A1 | 5/2010 | Suzuki | |
| 2010/0260468 A1 | 10/2010 | Khatib et al. | |
| 2010/0263012 A1* | 10/2010 | Huang et al. | 725/116 |
| 2011/0067050 A1 | 3/2011 | Samboursky | |
| 2011/0116767 A1 | 5/2011 | Souchard | |
| 2011/0314496 A1* | 12/2011 | Di Mattia et al. | 725/36 |
| 2012/0026519 A1 | 2/2012 | Yoshida | |
| 2012/0328265 A1 | 12/2012 | Sakuragi et al. | |
| 2014/0033042 A1 | 1/2014 | Khatib et al. | |

OTHER PUBLICATIONS

U.S. Appl. No. 13/527,944, filed Jun. 20, 2012 entitled, "Dynamic Split-Frame Preview of Video Editing Effects".

USPTO Office Action for U.S. Appl. No. 13/527,944 mailed Jun. 9, 2014.

USPTO Office Action for U.S. Appl. No. 13/527,944 mailed Dec. 2, 2013.

USPTO Office Action for U.S. Appl. No. 13/527,944 mailed May 29, 2013.

* cited by examiner

FIG. 6

ONLINE VIDEO ENHANCEMENT

CROSS-REFERENCE TO RELATED APPLICATIONS

This application claims priority to U.S. Provisional Patent Application No. 61/581,251, filed Dec. 29, 2011, which is hereby incorporated by reference in its entirety.

TECHNICAL FIELD

The disclosure relates online enhancement of videos.

BACKGROUND

Video hosting websites typically maintain a repository of videos and provide a user interface that allows users to browse, search, and watch videos. Some video hosting websites produce original video content. Other video hosting websites license video content from third parties. Other video hosting websites allow users to upload videos and share those videos with one or more other users or with the public at large.

After users have uploaded a video to a video hosting website, users sometimes want to enhance the video. One option for users is to enhance videos locally, using a video enhancement application resident on a client device, such as a personal computer. Enhancing a video locally requires first that the user have access to a video enhancement application and a local copy of the video. After the video is enhanced locally, if the user wants to share the enhanced version with others using the video hosting website, the user needs to upload the new version to the video hosting website.

SUMMARY

Disclosed herein are embodiments of systems and methods for online enhancement of videos.

One aspect of the disclosed embodiments is a method for online enhancement of videos. The method includes rendering, at one or more computers, a first video stream based on a first video; transmitting the first video stream to a client; receiving, at the one or more computers, a first user input from a client, the first user input selecting at least one enhancement operation; rendering, at the one or more computers, a second video stream based on the first video and the at least one enhancement operation; and transmitting the second video stream to the client.

Another aspect of the disclosed embodiments is an apparatus for online enhancement of videos. The apparatus includes one or more computers configured to: render, at the one or more computers, a first video stream based on a first video; transmit the first video stream to a client; receive, at the one or more computers, a first user input from a client, the first user input selecting at least one enhancement operation; render, at the one or more computers, a second video stream based on the first video and the at least one enhancement operation; and transmit the second video stream to the client.

Another aspect of the disclosed embodiments is a non-transitory readable medium including program instructions executable by one or more processors that, when executed, cause the one or more processors to perform operations for online enhancement of videos. The operations include rendering, at the one or more computers, a first video stream based on a first video; transmitting the first video stream to a client; receiving, at the one or more computers, a first user input from a client, the first user input selecting at least one enhancement operation; rendering, at the one or more computers, a second video stream based on the first video and the at least one enhancement operation; and transmitting the second video stream to the client.

Another aspect of the disclosed embodiments is a method for online enhancement of videos. The method includes receiving, at one or more computers, a first user input from a client, the first user input selecting at least one enhancement operation to be applied to a first video; rendering a second video based on the first video and the at least one enhancement operation; storing the second video; associating the second video with a first uniform resource locator that was previously associated with the first video; generating a second uniform resource locator; and associating the second uniform resource locator with the first video.

BRIEF DESCRIPTION OF THE DRAWINGS

The description herein makes reference to the accompanying drawings wherein like reference numerals refer to like parts throughout the several views, and wherein:

FIG. 6 is an illustration of a fourth user interface for online video enhancement.

DETAILED DESCRIPTION

Video hosting services are available that allow users to store videos in a database, to view the videos and to share the videos stored in the database with third parties. Stored videos commonly are assigned a uniform resource locator (URL) that is unique to the video, and can be used by third parties to access the video. Sometimes, users want to enhance videos after they have been uploaded to a video hosting service. One method of enhancing videos is to download the video from the video hosting service, enhance the video locally on a client device such as a personal computer, and then upload the enhanced video to the video hosting service. Disclosed herein are embodiments of systems and methods for enhancing a video within the video hosting service environment, without the intermediate steps of downloading the video to a client device, enhancing the video locally, and re-uploading the enhanced version to the web hosting service.

Figure 1:
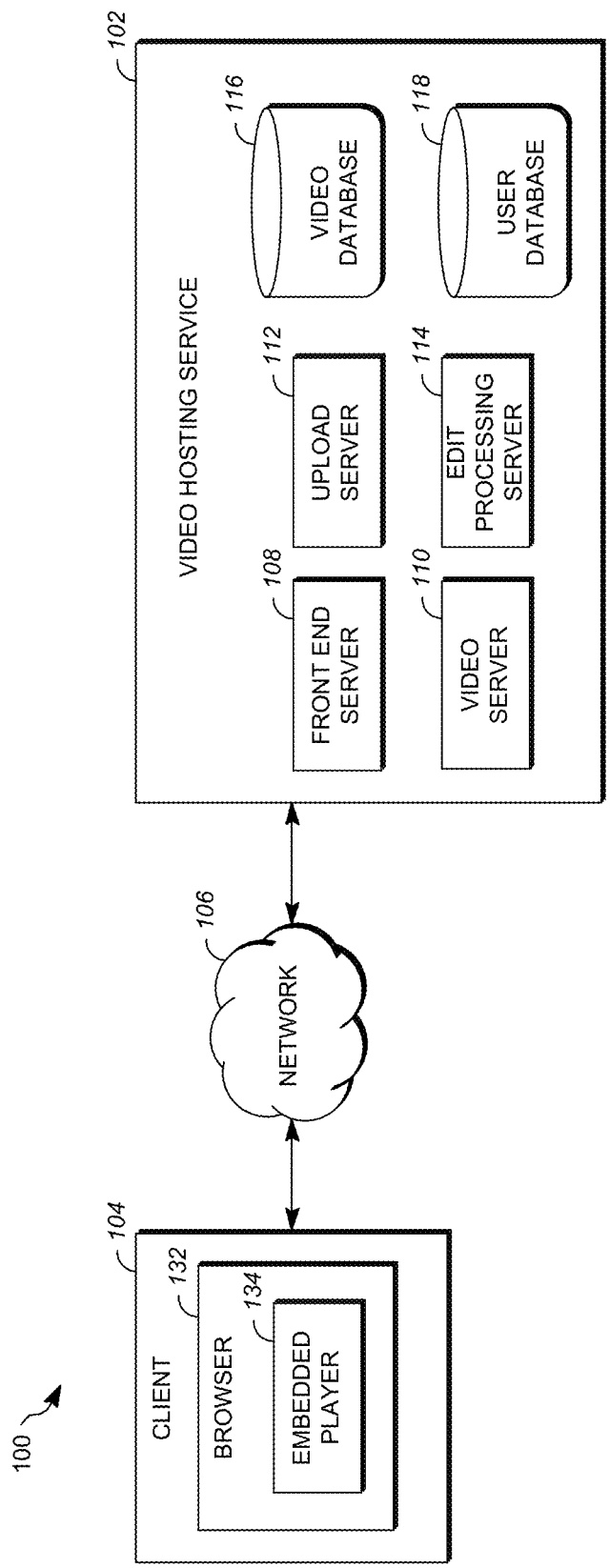
FIG. 1 is block diagram showing an example of a system architecture for implementation of an online video enhancement system.

FIG. 1 is a block diagram of an example of a system 100 for online video enhancement. A video hosting service 102 can communicate with a client 104 via a network 106. Based on input from the client 104, the video hosting service 102 can enhance a video and cause an enhanced version of the video to be displayed at the client 104. Communications between the client 104 and the video hosting service 102, or between the other distinct units of FIG. 1, may be encrypted or otherwise encoded.

The video hosting service 102 can include one or more servers, such as a front end server 108, a video server 110, an upload server 112, and an edit processing server 114. The functions performed by these servers can, in some implementations, be consolidated and performed by a single server computer. In other implementations, the functions performed by each of these servers can be distributed over a large number of server computers.

The video hosting service 102 can also include a video database 116 and a user database 118. Other conventional features, such as firewalls, load balancers, application servers, failover servers, site management tools, and so forth can be included.

The front end server 108 is operable to receive information from and send information to the client 104. For example, the front end server can receive HTTP requests from the client 104. In response to requests that are received from the client 104, the front end server 108 can transmit content, such as a web page (i.e., HTML and/or additional code defining a web page) along with any content associated with the web page. As an example, the front end server 108 can output web pages that define one or more user interfaces that are associated with the system 100, transmit the user interfaces to the client 104 and receive user input from the client 104.

In some implementations, all requests from the client 104 are received at the front end server 108 and responded to by the front end server 108 or forwarded to one or more of the video server 110, the upload server 112, or the edit processing server 114 as appropriate. In other implementations, requests from the client 104, in certain cases, can be transmitted directly to the video server 110, the upload server 112 or the edit processing server 114.

The video server 110 can cause videos to be displayed at the client 104 via the network 106 for viewing by the user. For example, the video server 110 can generate a video stream that is based on a video, and transmit the video stream to the client 104. The video stream can be transmitted directly to the client 104, or can be routed via the front end server 108.

The upload sever 112 can receive uploaded videos from the client 104 via the network 106. The uploaded videos can include, for example, video, audio or a combination of video and audio. The uploaded videos are processed by the upload server 112 and stored in the video database 116. This processing can include format conversion (transcoding), compression, metadata tagging, and other data processing. In some examples, an uploaded content file can be associated with the uploading user by updating the user's account record in the user database 118 as needed.

The edit processing server 114 is operable to implement online video enhancement functions. Operation of the edit processing server 114 will be explained in detail herein.

The video database 116 can be used to store the received videos. The video database 116 stores video content and associated metadata, provided by their respective content owners. The video files can have metadata associated with each file such as a video ID, artist, video title, label, genre, and time length. The video database 116 can also store mapping data that maps URLs to videos stored in the video database 116. This can, for example, allow the video database 116 to identify and output a selected video based on a query that includes all or part of a URL.

In some examples, the user database 118 can maintain a record of users that upload videos to the website and/or view videos on the website. An individual user can be assigned a user ID (also referred to as a user identity). The user ID can be based on any identifying information, such as the user's IP address, user name, or the like. The user database 118 may also contain information about the reputation of the user in both the video context, as well as through other applications, such as the use of email or text messaging. The user database 118 may further contain information about membership in user groups, e.g. a group of users that can view the same annotations. The user database 118 may further contain, for a given user, a list of identities of other users who are considered friends of the user. (The term "list", as used herein for concepts such as lists of authorized users, URL lists, and the like, refers broadly to a set of elements, where the elements may or may not be ordered.)

Examples of a suitable video hosting service 102 for implementation of the system include the YouTube™ and Google Video™ websites; other video hosting sites are known as well, and can be adapted to operate according the teaching disclosed herein. It will be understood that the term "website" represents any system and method of providing content and is not intended to be limited to systems that support content provided via the Internet or the HTTP protocol.

The various servers can be conventionally implemented, whether as a single piece of software or hardware or as multiple pieces of software or hardware and can couple to the network 106. In general, functions described in one example as being performed on the server side can also be performed on the client side in other examples if appropriate.

The client 104 can execute an application such as a browser 132. The client 104 can be implemented in the form of any of a variety of different computing devices. Examples of devices that can be utilized as the client 104 include personal computers, digital assistants, personal digital assistants, cellular phones, mobile phones, smart phones, laptop computers and tablet computers. Other devices can be utilized as the client 104. Applications other than the browser 132 can be executed by the client 104 and can be utilized to perform the functions that are described herein with reference to the browser 132.

Using the browser 132, the client can connect to the video hosting service 102 via the network 106. While only a single client 104 and browser 132 are shown, it is understood that very large numbers (e.g., millions) of clients are supported and can be in communication with the video hosting service 102 at any time via the network 106.

The browser 132 can include an embedded video player 134. The embedded video player 134 can be a native functionality of the browser 132 itself, or can be a plug-in component that is utilized by the browser 132 such as, for example, the Flash™ player from Adobe Systems, Inc. Any other player adapted for the video file formats used by the video hosting service 102 can be utilized. A user can access a video from the video hosting service 102 by browsing a catalog of videos, conducting searches on keywords, reviewing play lists from other users or the system administrator (e.g., collections of videos forming channels), or viewing videos associated with a particular user group (e.g., communities).

The network 106 can be any kind of wired and/or wireless computing network or communications means capable of transmitting data or signals, such as a wireless and/or wired computing network allowing communication via, for example, an 802.11 ("Wi-Fi") protocol, cellular data protocol (e.g., EDGE, CDMA, TDMA, GSM, LTE), and the like. Suitable examples include the internet, which is a packet-switched network, a local area network (LAN), wide area network (WAN), virtual private network (VPN), or any other means of transferring data. A single network or multiple networks that are connected to one another can be used. It is specifically contemplated that multiple networks of varying types can be connected together and utilized to facilitate the communications contemplated by the systems and elements described in this disclosure.

Figure 2:
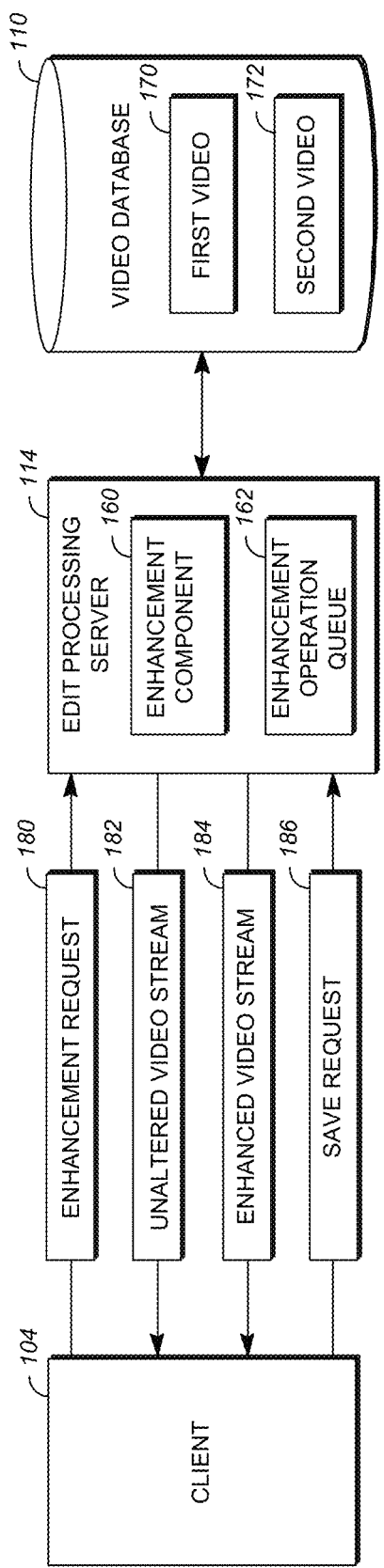
FIG. 2 is a block diagram showing operation of an online video enhancement system.

As shown in FIG. 2, the edit processing server 114 can include an enhancement component 160 and an enhancement operation queue 162. The enhancement component 160 can be one or more software components that are executed by the edit processing server 114. The enhancement operation queue 162 can be a running list that describes one or more enhancement operations that have been requested by the client 104.

The edit processing server 114 can receive a video as an input, such as a first video 170 that is stored in the video database 116. As an output, the edit processing server 114 can render a second video 172 and save the second video 172 by storing it in the video database 116. The first video 170 can be an original version of a video, and the second video 172 can be an enhanced version of the first video 170, which is saved at the completion of the enhancement process.

In one example, the edit processing server can receive one or more enhancement requests 180. Each of the enhancement requests 180 describes or represents one or more operations to be performed on a video, where the operations modify a characteristic of the video, such as the appearance of the video, when rendered, the length of the video, or an audio component that accompanies the video. For example, the client 104 can receive user input requesting a brightness enhancement. The user input can be, for example, in the form of text input from an input device such as a keyboard, or selection of a selectable interface element (e.g. a mouse click or touch input) of a graphical interface that is displayed by the client 104. The user input is transmitted to edit processing server 114 by the client 104, either directly or via the front end server 108, in the form of one of the enhancement requests 180. The enhancement operation that is described by the enhancement request 180 can be added to the enhancement operation queue 162 by the edit processing server 114.

The edit processing server 114 can prepare and transmit one or more video streams to the client 104. The one or more video streams can include a low resolution representation of the first video 170 prior to enhancements, and a low resolution representation of the first video 170 incorporating the enhancement operations that are described by the enhancement operation queue 162.

In one example, multiple video streams are transmitted to the client 104. The video streams can include a first video stream, such as an unaltered video stream 182, and a second video stream, such as an enhanced video stream 184. The unaltered video stream 182 can be a low resolution representation of the first video 170 prior to enhancements. The enhanced video stream 184 can be generated by the enhancement component 160 based on the first video 170 and the enhancement operation queue 162. The enhanced video stream 184 can be a low resolution representation of the first video 170 including the enhancements, if any, that are applied to the first video 170 by the enhancement component 160. If no enhancements are included in the enhancement operation queue 162, as may be the case before the client 104 transmits one of the enhancement requests 180 to the edit processing server 114, the enhanced video stream 184 can be a low resolution representation of the first video 170 with no enhancements applied.

The edit processing server 114 can make the unaltered video stream 182 and the enhanced video stream 184 available for viewing by the user of the client 104. For example, the edit processing server 114 can transmit the unaltered video stream 182 and the enhanced video stream 184 to the client 104. The edit processing server 114 can further cause the client 104 to display the unaltered video stream 182 and the enhanced video stream 184, for example, side-by-side and synchronized, such that the user can evaluate the effect of the requested enhancement or enhancements.

In another example, a single video stream is transmitted to the client 104, and includes side by side representations of the first video 170 both prior to enhancements, and incorporating the enhancement operations that are described by the enhancement operation queue 162. The single video stream can be encoded such that the side by side representations of the first video 170 are synchronized, such that the user can evaluate the effect of the requested enhancement or enhancements.

If the user wishes to save the enhancements, the user can request that the edit processing server 114 store an enhanced version of the first video 170. The client 104 can receive input from the user, and transmit a save request 186 to the edit processing server 114. Upon receiving the save request 186, the edit processing server 114 performs a save operation. In one example of the save operation, the edit processing server 114 uses the enhancement component 160 to create the second video 172 by modifying the first video 170 based on the enhancement operation queue 162. For example, the content of the first video 170 can be modified to incorporate each of the enhancements that are described by the enhancement operation queue 162. After the second video 172 is completed, it can be stored in the video database 116.

In one example, the first video 170 is initially associated with a first URL. When the second video 172 is created by the edit processing server 114, the edit processing server 114 associates the second video 172 with the first URL. The edit processing server 114 then defines a second URL, and associates the first video 170 with the second URL. This causes the most recent version of the video, here the second video 172, to be associated with a URL that does not change when the video is enhanced. At the same time, the prior version of the video, here the first video 170, is retained.

Figure 3:
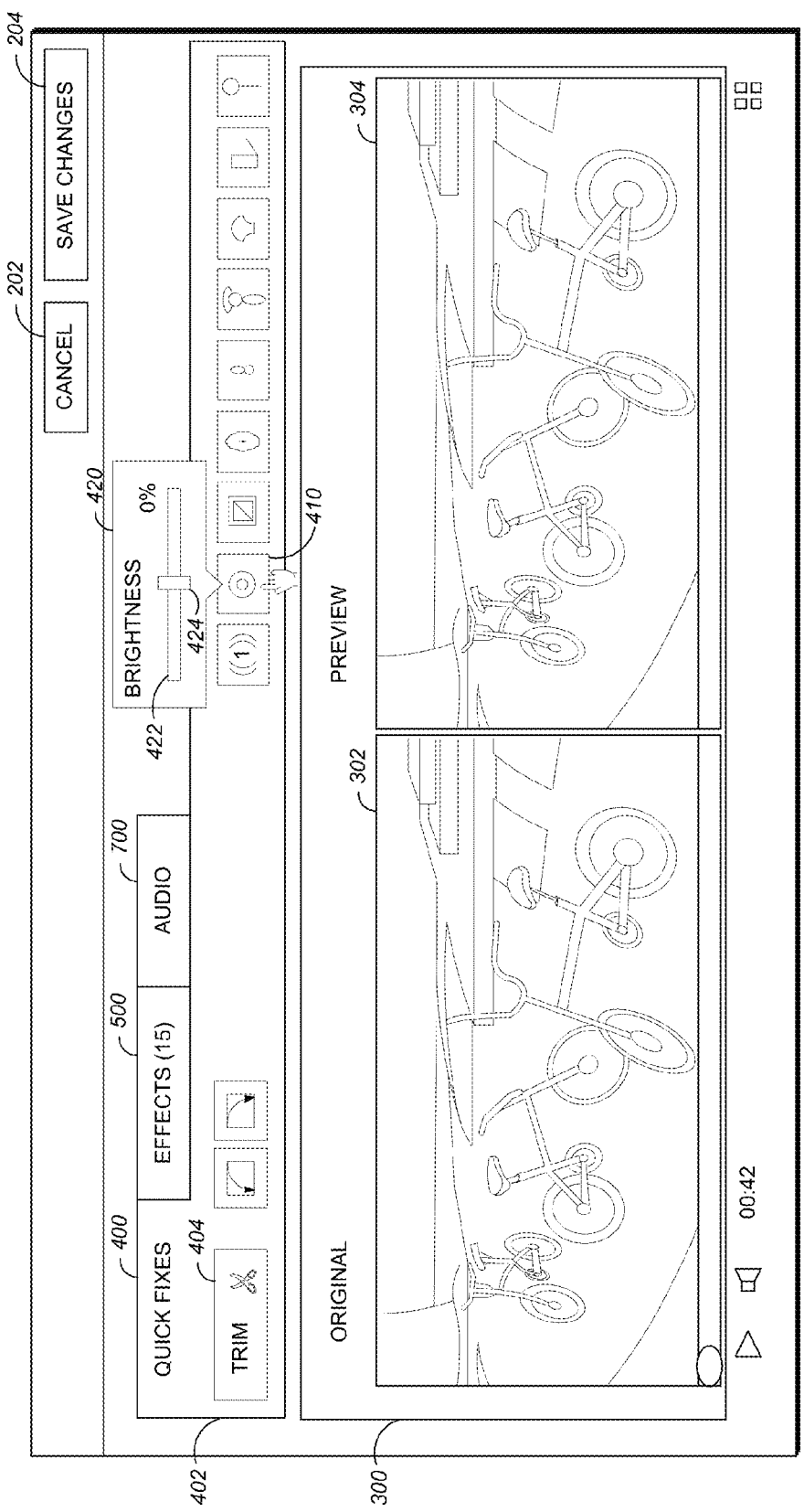
FIG. 3 is an illustration of a first user interface for online video enhancement.

As shown in FIG. 3, the browser 132 can cause an enhancement interface 200 and a content display area 300 to be output, such as to a display device that is associated with the client 104. For example, in response to a request from the client 104, the front end server 108 can transmit content, such as a web page along with any content associated with the web page. The web page can be rendered by the browser 132 and displayed within the content display area of the browser 132.

The enhancement interface 200 can include user selectable elements. For example, the enhancement interface 200 can include a cancel button 202 and a save changes button 204. A user selection of the cancel button 202 can transmit instructions to the edit processing server 114 that will cause the enhancements chosen by the user to be ignored by the edit processing server 114. As a result, the second video 172 will not be generated by the edit processing server 114 and the enhancement operation queue 162 will be purged. A user selection of the save changes button 204 can cause the save request 186 to be transmitted to the edit processing server 114, which will cause the edit processing server 114 to perform the save operation in which the second video 172 is created and stored at the video database 116, as previously described.

In addition, the enhancement interface 200 can include tabs that allow the user to navigate to additional user interfaces that provide additional or different enhancement features, as will be described herein. For example, the enhancement interface 200 can have a quick fixes tab 400, an effects tab 500 and an audio tab 700.

The content display area 300 can include an original video representation 302 and an enhanced video representation 304. The original video representation 302 can be a display that corresponds to the unaltered video stream 182. The enhanced video representation 304 can be a display that corresponds to the enhanced video stream 184. The original video representation 302 and the enhanced video representation 304 can be synchronized. For example, the original video representation 302 and the enhanced video representation 304, can simultaneously display video content corresponding to the same time point with respect to the first video 170. The synchronized or substantially synchronized display of the original video representation 302 and the enhanced video representation 304 allows, for example, the user to compare the representations and evaluate the chosen enhancements.

When the quick fixes tab 400 is selected, a quick fixes menu 402 can be displayed. The quick fixes menu 402 can include user selectable input elements for selecting enhancement for a video, such as the first video 170.

The quick fixes menu 402 can include, for example, a trim button 404. User selection of the trim button 404 can cause a trim interface 600 to be displayed (FIG. 5), as will be explained herein.

The quick fixes menu 402 can also include a plurality of user interface elements that cause one or more of the enhancement requests 180 to be transmitted to the edit processing server 114. For example, the quick fixes menu can include a brightness button 410. A brightness selection box 420 can be displayed in response to user selection of the brightness button 410. The brightness selection box 420 can include a brightness scale 422 and a brightness selection element 424 that positioned on the brightness scale 422. By selecting and adjusting the position of the brightness selection element 424 with respect to the brightness scale 422, the user can indicate a desired brightness level.

User manipulation of the brightness selection element 424 causes the enhancement request 180 to be generated at the client 104 and transmitted to the edit processing server 114. In response, the edit processing server 114 can cause the display of the original video representation 302 and the enhanced video representation 304 to be paused. Each of the original video representation 302 and the enhanced video representation 304 can be paused at a frame corresponding to a first time point with respect to the first video 170. The edit processing server 114 can update the enhancement operation queue 162 to include the enhancement request 180 that was generated in response to manipulation of the brightness selection element 424 and execute the enhancement component 160 based on the enhancement operation queue 162. The edit processing server 114 then generates the enhanced video stream 184 and transmits it to the client 104 in synchronization with the unaltered video stream 182. The unaltered video stream 182 and the enhanced video stream 184 can be transmitted to the client 104 commencing from a time point with respect to the first video 170 that is based on the first time point, such as the first time point itself, or a time selected based on the first time point (e.g. 3 seconds prior to the first time point), thereby causing synchronized display of the original video representation 302 and the enhanced video representation 304 at the client 104. The user can then select additional enhancement operations, which are applied in the same manner.

The brightness button 410 and brightness selection box 420 are an example of user interface elements that allow selection of an enhancement operation that generates one or more of the enhancement requests 180. Other buttons can be provided in association with other enhancement operations, such as a contrast adjustment, or a saturation adjustment. These adjustments may or may not be associated with a selection box and/or a control element.

Figure 4:
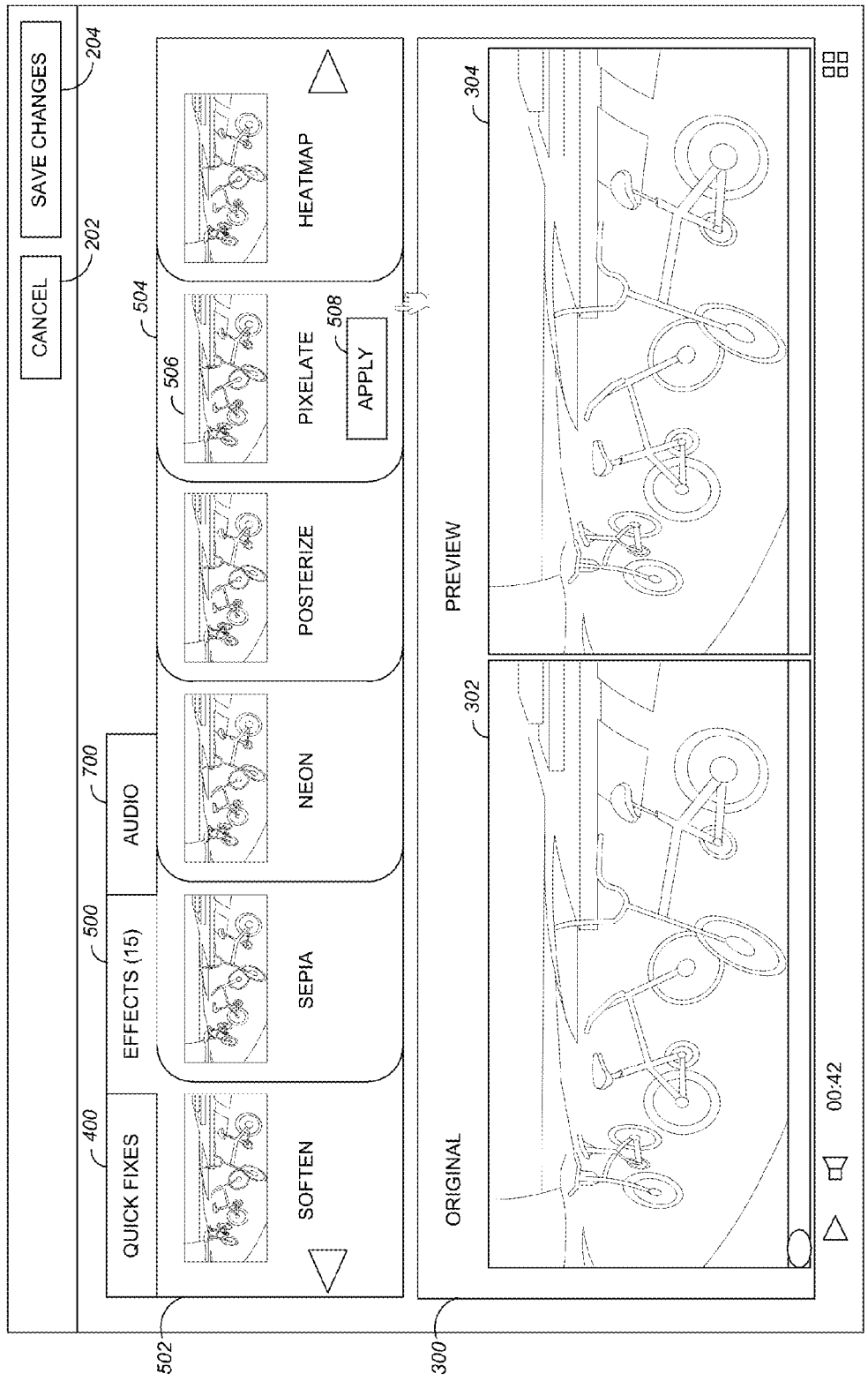
FIG. 4 is an illustration of a second user interface for online video enhancement.

A user selection of the effects tab 500 on the enhancement interface 200 can cause the front end server 108 to display the effects interface 502, as shown in FIG. 4. The effects interface 502 can include a set of effect panels, each of which describes an effect that can be applied to the video in response to a single operation by the user. The effects panel can describe each effect, for example, by displaying a static thumbnail representing the first video 170 with the effect in question applied.

For example, the effects interface 502 can include a pixelate panel 504. The pixelate panel 504 can include a pixelate thumbnail 506. An apply button 508 can be displayed within the pixelate panel 504, either initially, or in response to hovering over or selecting the pixelate panel. Upon user selection of the apply button 508, the enhancement request 180 is generated and transmitted to the edit processing server 114. Display of the original video representation 302 and the enhanced video representation 304 can be paused and later restarted after generation of the enhanced video stream 184 including the pixelate effect, in a manner similar to that described with respect to operation of the brightness button 410.

Figure 5:
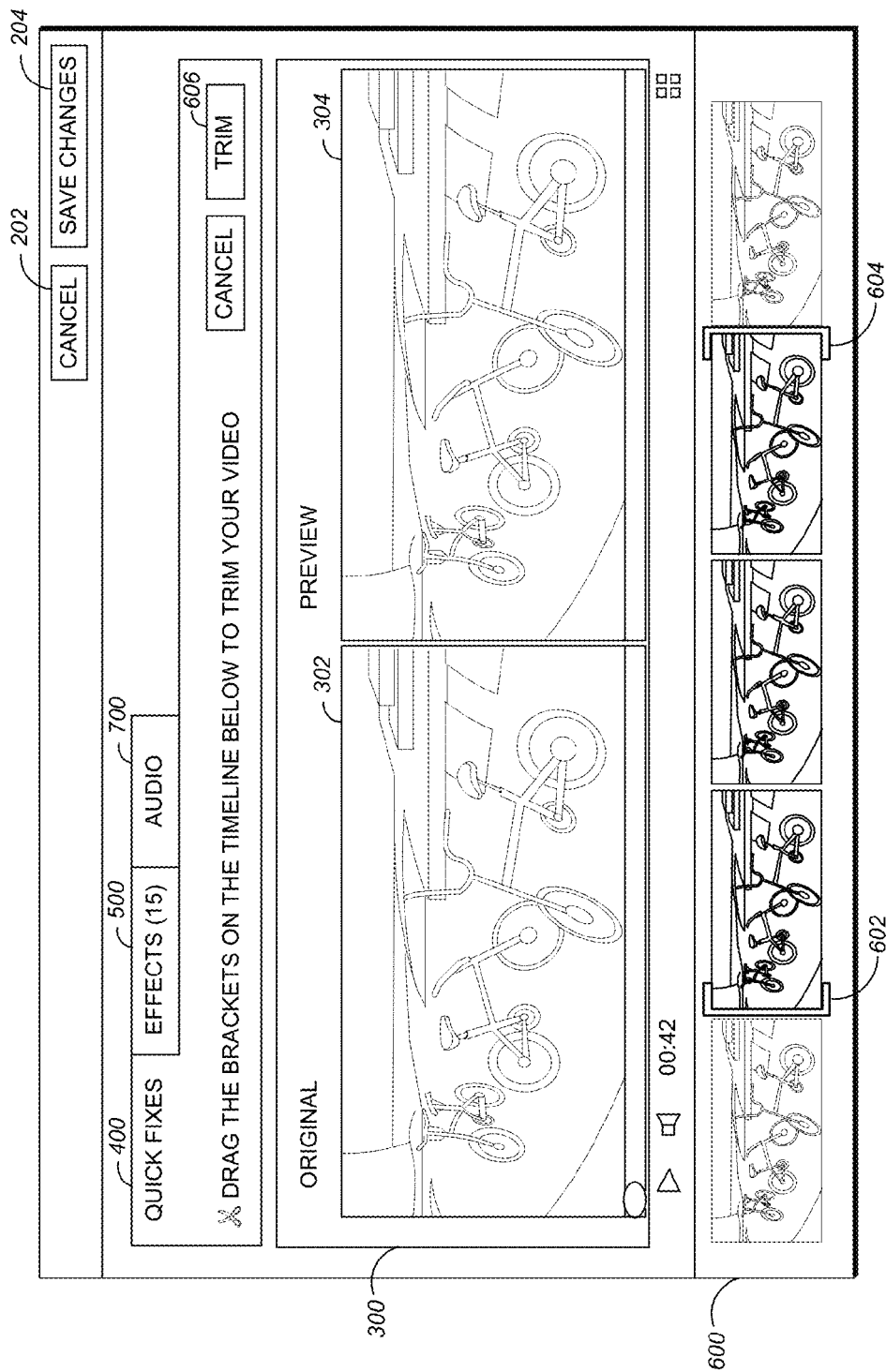
FIG. 5 is an illustration of a third user interface for online video enhancement.

The system 100 can include a trim function that allows the user of client 104 to generate the second video 172 by modifying the temporal extents of the first video 170, using the trim interface 600, as shown in FIG. 5. The trim interface 600 can include a plurality of thumbnails displayed sequentially. Each thumbnail can represent a particular time point with respect to the first video 170. For example, the plurality of thumbnails can be arranged in a row with the with the leftmost thumbnail representing a time point at or near the beginning of the first video 170, and the rightmost thumbnail representing a time point at or near the end of the first video 170. The remaining thumbnails represent intermediate time points with respect to the first video 170. For example, a thumbnail can be shown for each 5 seconds of the first video 170.

In order to modify the temporal extents of the first video 170, the trim interface 600 includes one or more user selectable interface elements. In one example, by user manipulation of a selectable start marker 602 and a selectable end marker 604, a portion of the first video 170 can be removed from the second video 172. For example, either or both of an initial time period of the first video 170 or an ending time portion of the first video 170 can be trimmed based on the positions of the selectable start marker 602 and the selectable end marker 604. User selection of a done button 606 generates the enhancement request 180 and causes the edit processing server 114 to regenerate the enhanced video stream 184, similar the manner previously described, but by modifying the temporal extents of the enhanced video stream based on the time points represented by the selectable start marker 602 and the selectable end marker 604. In another example, multiple sets of the selectable start marker 602 and selectable end marker 604 could be provided to, for example, to combine segments of the first video 170 into a new video, or to split the first video 170 into multiple new videos each representing a sub-region of the first video 170.

Figure 6:
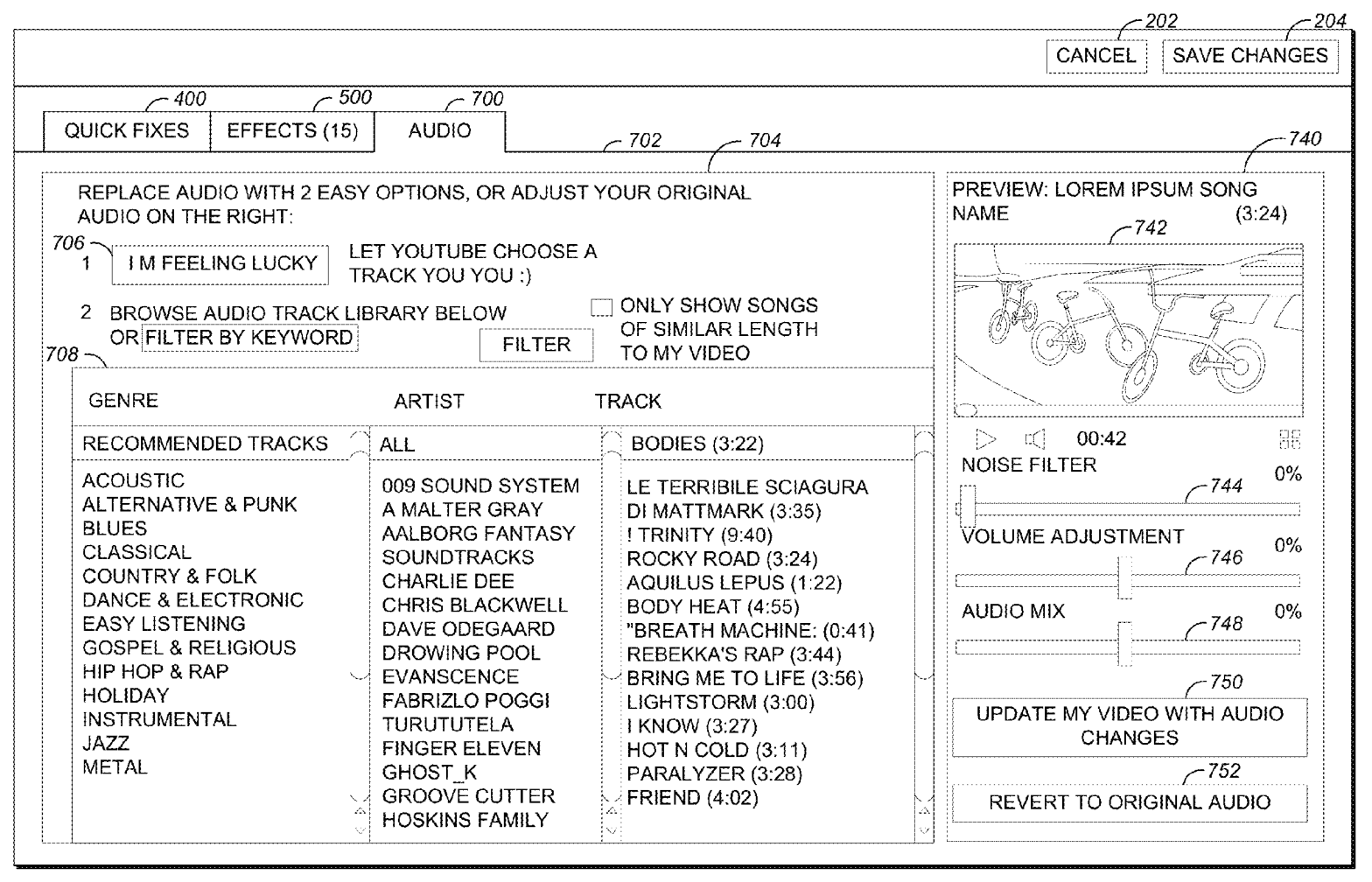

FIG. 6 shows an audio track interface 702. A user can access the audio track interface 702 by selecting the audio tab 700. The audio track interface 702 can be used by the user of client 104 to select an audio track to accompany a video, such as the first video. The selected audio track can be mixed with a pre-existing audio track from the first video 170 or can replace the pre-existing audio track. The audio track interface 702 includes an audio selection interface 704 and an audio mixer interface 740.

The audio selection interface 704 provides two options for selecting an audio track to be added to the first video 170. The user can request that the edit processing server 114 select an audio track for the video based on an algorithm, using an automatic selection button 706. The automatic selection button 706 can cause selection of an audio track by the edit processing server 114, for example, based on characteristics of the first video 170 such as length or subject matter. Alternatively, the user can directly select an audio track from a library of available audio tracks, which are shown in an audio display region 708 and sorted, for example, by genre, artist name, and track name. Other implementations of the audio selection interface 704 can provide, for example, creation of a live voice over track, upload of arbitrary audio content that is owned by the user, or synthesized speech that is generated based on text input.

The audio track interface 702 includes an audio mixer interface 740. The audio mixer interface 740 can include a video playback area 742 where one of the unaltered video stream 182 or the enhanced video stream 184 is displayed synchronously with the selected audio track. The audio mixer interface 740 can also include user selectable elements such as a noise filter adjustment 744 that modifies a magnitude of a noise filter adjustment, a volume adjustment 746, an audio mix adjustment 748 that modifies the volume of the selected audio track relative to the pre-existing audio track, an update button 750 and a revert button 752.

Figure 7:
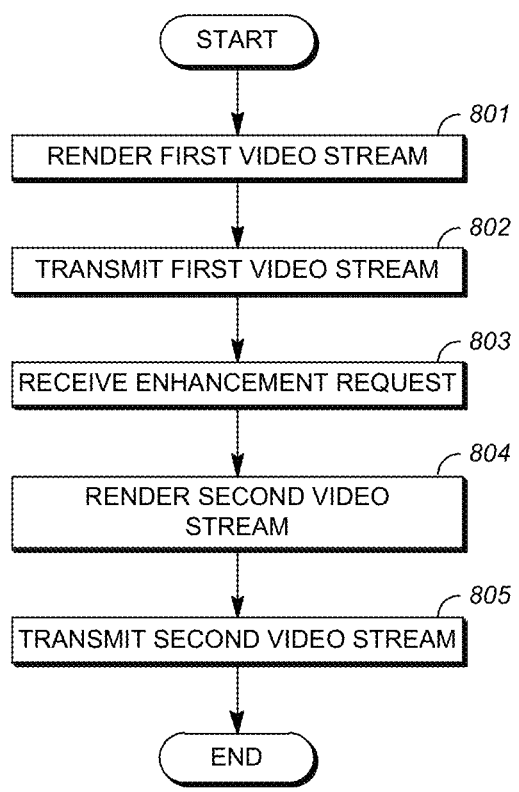
FIG. 7 is a flow chart showing a first example of a process for online video enhancement.

A first process for online video enhancement is shown in FIG. 7. In operation 801, the edit processing server 114 retrieves the first video 170 from the video database 116 and renders a first video stream, such as the enhanced video stream 184. If no enhancements are described by the enhancement operation queue 162, the enhanced video stream 184 can be a low resolution version of the first video 170, with no changes in appearance.

In operation 802, the edit processing server 114 transmits the first video stream, here the enhanced video stream 184, to the client 104, and causes it to be displayed as the enhanced video representation 304. In operation 803, the edit processing server 114 receives the enhancement request 180 from the client 104, and updates the enhancement operation queue 162 to include the enhancement request 180.

In operation 804, the edit processing server 114 renders a second video stream, such as an updated version of the enhanced video stream 184 including the enhancements described by the enhancement operation queue 162. In operation 805, the edit processing server 114 transmits the second video stream, here the updated version of the enhanced video stream 184, to the client 104. The edit processing server 114 can transmit the second video stream such that it starts at the point in time with respect to the first video 170 that corresponds to or is based on the time point at which the first video stream was paused.

Figure 8:
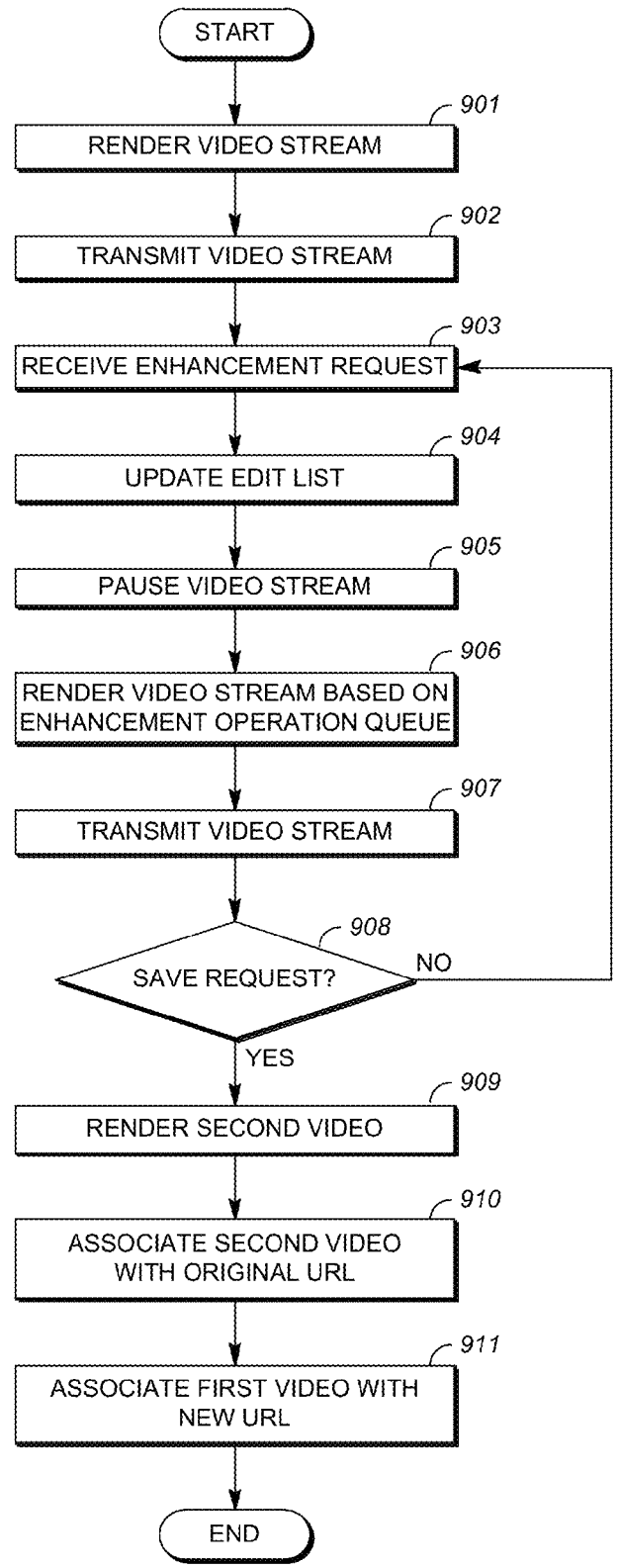
FIG. 8 is a flow chart showing a second example of a process for online video enhancement.

A second process for online video enhancement is shown in FIG. 8. In operation 901, the edit processing server 114 retrieves the first video 170 from the video database 116. Based on the first video 170, the edit processing server 114 generates a first video stream. The first video stream can be a low resolution representation of the first video 170.

In operation 901, the edit processing server 114 retrieves the first video 170 from the video database 116 and renders a first video stream, such as the enhanced video stream 184. If no enhancements are described by the enhancement operation queue 162, the enhanced video stream 184 can be a low resolution version of the first video 170, with no changes in appearance. Optionally, the edit processing server 114 can also render an additional video stream, such as the unaltered video stream 182.

In operation 902, the edit processing server 114 transmits the first video stream, here the enhanced video stream 184, to the client 104, and causes it to be displayed as the enhanced video representation 304. Optionally, the edit processing server 114 can transmit the additional stream, here the unaltered video stream 182, and cause it to be displayed as the original video representation 302.

In operation 903, the edit processing server 114 receives an enhancement request from the client 104, and updates the enhancement operation queue 162 to include the enhancement request 180. In operation 904, the edit processing server 114 updates the enhancement operation queue 162 based on the enhancement request 180.

In operation 905, the edit processing server 114 pauses streaming of the first video stream, here the enhanced video stream 184, at a first time point with respect to the first video 170. Optionally, the edit processing server 114 can also pause streaming of the additional video stream, herein the unaltered video stream 182.

In operation 906, the edit processing server 114 renders the second video stream, such as an updated version of the enhanced video stream 184 including the enhancements described by the enhancement operation queue 162.

In operation 907, the edit processing server 114 transmits the second video stream, here the updated version of the enhanced video stream 184, to the client 104. The edit processing server 114 can cause the second video stream to be displayed on the client 104, commencing at a time point that is based on the first time point with respect to the first video 170. Optionally, the edit processing server 114 can also transmit the additional stream, here the unaltered video stream 182, commencing at the same time point at which transmission of the second video stream commences, such that the original video representation 302 and the enhanced video representation 304 are substantially synchronized when displayed at the client 104.

In operation 908, the edit processing server 114 determines whether the save request 186 has been received. If the save request 186 has not been received, the process returns to operation 903 upon the next receipt of the enhancement request 180. If the save request 186 has been received, the process proceeds to operation 909.

In operation 909, the edit processing server 114 performs a save operation by, for example, rendering the second video 172 based on the first video 170 and the enhancement operation queue 162, as explained previously. Upon completion of the save operation, the second video 172 can be stored in the video database 116. In operation 910, the edit processing server 114 associates the second video 172 with the URL that was previously associated with the first video 170. In operation 911, the video server creates a new URL and associates the first video 170 with the new URL.

As used herein, the term "computer" means any device of any kind that is capable of processing a signal or other information. Examples of computers include, without limitation, an application-specific integrated circuit (ASIC) a programmable logic array (PLA), a microcontroller, a digital logic controller, a digital signal processor (DSP), a desktop computer, a laptop computer, a tablet computer, and a mobile device such as a mobile telephone. A computer does not necessarily include memory or a processor. A computer may include software in the form of programmable code, micro code, and or firmware or other hardware embedded logic. A computer may include multiple processors which operate in parallel. The processing performed by a computer may be distributed among multiple separate devices, and the term computer encompasses all such devices when configured to perform in accordance with the disclosed embodiments.

Figure 9:
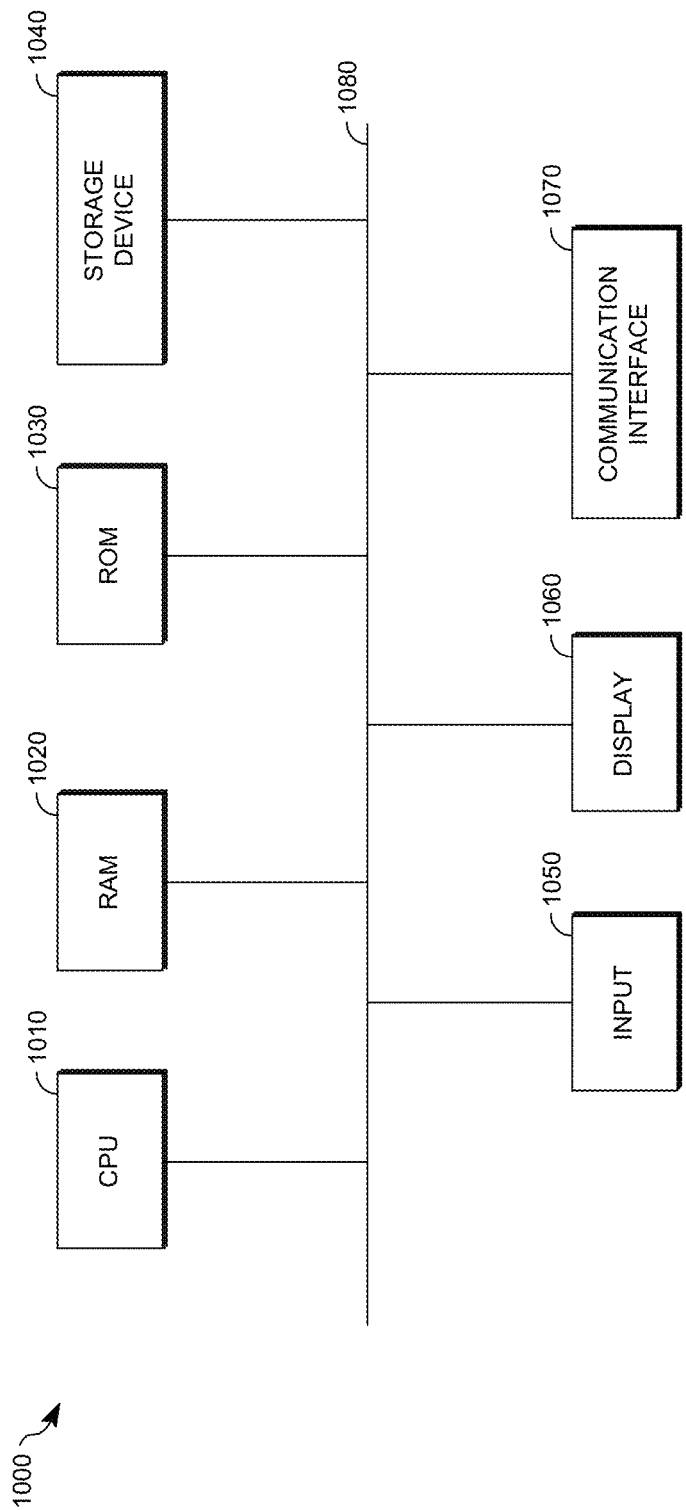
FIG. 9 is a block diagram showing an example of a computer system.

An example of a device that can be used as a basis for implementing the systems and functionality described herein, including the front end server 108, the video server 110, the upload server 112, the edit processing server 114, and the client 104, is a conventional computer 1000, as shown in FIG. 9. The conventional computer 1000 can be any suitable conventional computer. As an example, the conventional computer 1000 can include a processor such as a central processing unit (CPU) 1010 and memory such as RAM 1020 and ROM 1030. A storage device 1040 can be provided in the form of any suitable computer readable medium, such as a hard disk drive. One or more input devices 1050, such as a keyboard and mouse, a touch screen interface, etc., allow user input to be provided to the CPU 1010. A display 1060, such as a liquid crystal display (LCD) or a cathode-ray tube (CRT), allows output to be presented to the user. The input devices 1050 and the display 1060 can be incorporated in a touch sensitive display screen. A communications interface 1070 is any manner of wired or wireless means of communication that is operable to send and receive data or other signals using the network 106. The CPU 1010, the RAM 1020, the ROM 1030, the storage device 1040, the input devices 1050, the display 1060 and the communications interface 1070 are all connected to one another by a bus 1080.

Each of the front end server 108, the video server 110, the upload server 112, the edit processing server 114, and the client 104, and all other computer-based systems described herein can be implemented in the form of multiple computers, processors, or other systems working in concert. As an example, the edit processing server 114 can be distributed among a plurality of conventional computers, such as the computer 1000, each of which are capable of performing some or all of the functions of the edit processing server 114.

Further, all or a portion of the implementations of the present disclosure can take the form of a computer program product accessible from, for example, a non-transitory computer-usable or computer-readable medium. A computer-usable or computer-readable medium can be any tangible device that can, for example, contain, store, communicate, or transport the program for use by or in connection with any processor. The medium can be, for example, any type of disk including floppy disks, optical disks, CD-ROMs, magnetic or optical cards, application specific integrated circuits (ASICs), or any type of non-transitory media suitable for storing electronic instructions, and each coupled to a computer system bus.

It is to be understood that the disclosure is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method, comprising:
   receiving, at one or more computers, a request for a first video from a client;
   transmitting a first video stream associated with the first video to a client;
   receiving, at the one or more computers, a first user input from a client, the first user input selecting at least one enhancement operation;
   creating, at the one or more computers, a second video stream associated with an enhanced version of the first video, the enhanced version of the first video representing an initial version of the first video with the at least one enhancement operation applied; and
   transmitting the second video stream to the client for simultaneous presentation of the initial version of the first video and the enhanced version of the first video individually on the client.

2. The method of claim 1, further comprising:
   pausing transmission of the first video stream in response to receiving the first user input, wherein the first video stream is paused at a first time point with respect to the first video, wherein transmitting the second video stream to the client includes commencing transmission of the second video stream at the first time point with respect to the first video.

3. The method of claim 1, further comprising:
   receiving a second user input from the client, the second user input requesting a save operation;
   rendering a second video based on the first video and the at least one enhancement operation; and
   storing the second video.

4. The method of claim 3, further comprising:
   associating the second video with a first uniform resource locator that was previously associated with the first video.

5. The method of claim 4, further comprising:
   generating a second uniform resource locator; and
   associating the second uniform resource locator with the first video.

6. The method of claim 1, further comprising:
   rendering a third video stream based on the first video; and
   transmitting information to the client for causing the client to display the second video stream and the third video stream simultaneously.

7. The method of claim 6, wherein transmitting information to the client for causing the client to display the second video stream and the third video stream simultaneously includes synchronizing playback of the second video stream and the third video stream.

8. An apparatus, comprising:
   one or more computers configured to:
   receive, at the one or more computers, a request for a first video from a client;
   transmit a first video stream associated with the first video to a client;
   receive, at the one or more computers, a first user input from a client, the first user input selecting at least one enhancement operation;
   create, at the one or more computers, a second video stream associated with an enhanced version of the first video, the enhanced version of the first video representing an initial version of the first video with the at least one enhancement operation applied; and
   transmit the second video stream to the client for simultaneous presentation of the initial version of the first video and the enhanced version of the first video individually on the client.

9. The apparatus of claim 8, wherein the one or more computers are further configured to pause transmission of the first video stream in response to receiving the first user input, wherein the first video stream is paused at a first time point with respect to the first video, wherein transmitting the second video stream to the client includes commencing transmission of the second video stream at the first time point with respect to the first video.

10. The apparatus of claim 8, wherein the one or more computers are further configured to:
  receiving a second user input from the client, the second user input requesting a save operation;
  rendering a second video based on the first video and the at least one enhancement operation; and
  storing the second video.

11. The apparatus of claim 10, wherein the one or more computers are further configured to associate the second video with a first uniform resource locator that was previously associated with the first video.

12. The apparatus of claim 11, wherein the one or more computers are further configured to:
  generate a second uniform resource locator; and
  associate the second uniform resource locator with the first video.

13. The apparatus of claim 8, wherein the one or more computers are further configured to:
  render a third video stream based on the first video; and
  transmit information to the client for causing the client to display the second video stream and the third video stream simultaneously.

14. The apparatus of claim 13, wherein the one or more computers are further configured to:
  cause synchronized playback of the second video stream and the third video stream.

15. A non-transitory computer readable medium including program instructions executable by one or more processors that, when executed, cause the one or more processors to perform operations, the operations comprising:
  receiving, at the one or more processors, a request for a first video from a client;
  transmitting a first video stream associated with the first video to a client;
  receiving, at the one or more processors, a first user input from a client, the first user input selecting at least one enhancement operation;
  creating, at the one or more processors, a second video stream associated with an enhanced version of the first video, the enhanced version of the first video representing an initial version of the first video with the at least one enhancement operation applied; and
  transmitting the second video stream to the client for simultaneous presentation of the initial version of the first video and the enhanced version of the first video individually on the client.

16. The non-transitory computer readable medium of claim 15, the operations further comprising:
  pausing transmission of the first video stream in response to receiving the first user input, wherein the first video stream is paused at a first time point with respect to the first video, wherein transmitting the second video stream to the client includes commencing transmission of the second video stream at the first time point with respect to the first video.

17. The non-transitory computer readable medium of claim 15, the operations further comprising:
  receiving a second user input from the client, the second user input requesting a save operation;
  rendering a second video based on the first video and the at least one enhancement operation; and
  storing the second video.

18. The non-transitory computer readable medium of claim 17, the operations further comprising:
  associating the second video with a first uniform resource locator that was previously associated with the first video.

19. The non-transitory computer readable medium of claim 18, the operations further comprising:
  generating a second uniform resource locator; and
  associating the second uniform resource locator with the first video.

20. The non-transitory computer readable medium of claim 15, the operations further comprising:
  rendering a third video stream based on the first video; and
  transmitting information to the client for causing the client to display the second video stream and the third video stream simultaneously includes synchronizing playback of the second video stream and the third video stream.

21. A method, comprising:
  receiving, by a processing device of a client computer, a first user input selecting at least one enhancement operation to be applied to a first video;
  receiving a second video representing an initial version of the first video with the at least one enhancement operation applied; and
  presenting, by the processing device of the client computer, the initial version of the first video and the enhanced version of the first video individually on a screen of the client computer at the same time.

22. The method of claim 21 wherein the initial version of the first video and the enhanced version of the first video are presented on the screen of the client computer side-by-side.

23. The method of claim 21 wherein the initial version of the first video and the enhanced version of the first video are played back on the screen of the client computer in a synchronized manner.

\* \* \* \* \*